| United States Patent [19] | [11] Patent Number: 4,734,204 |
| --- | --- |
| Lamb | [45] Date of Patent: Mar. 29, 1988 |

[54] POLYMALEIC ANHYDRIDE DERIVATIVES

[75] Inventor: Frank Lamb, Stockport, England

[73] Assignee: Ciba-Geigy Corporation, Ardsley, N.Y.

[21] Appl. No.: 770,898

[22] Filed: Aug. 30, 1985

[30] Foreign Application Priority Data

Sep. 11, 1984 [GB] United Kingdom ............... 8422904

[51] Int. Cl.$^4$ .............................................. B01D 17/04
[52] U.S. Cl. .................................. 210/708; 210/734; 525/384; 525/327.7
[58] Field of Search ......................................... 210/708

[56] References Cited

U.S. PATENT DOCUMENTS

| 3,919,258 | 11/1975 | Richardson et al. | 260/346.8 |
| 4,126,549 | 11/1978 | Jones et al. | 210/54 |
| 4,154,698 | 5/1979 | Doft | 210/708 |
| 4,212,788 | 7/1980 | Birrell et al. | 526/271 |
| 4,237,005 | 12/1980 | Becker | 210/708 |
| 4,396,499 | 8/1983 | McCoy et al. | 210/708 |

FOREIGN PATENT DOCUMENTS

| 1024725 | 4/1966 | United Kingdom . |
| 1143404 | 2/1969 | United Kingdom . |
| 1141859 | 2/1969 | United Kingdom . |
| 1193146 | 5/1970 | United Kingdom . |
| 1196247 | 6/1970 | United Kingdom . |
| 1267855 | 3/1972 | United Kingdom . |
| 1328840 | 9/1973 | United Kingdom . |
| 1346782 | 2/1974 | United Kingdom . |
| 1402917 | 8/1975 | United Kingdom . |
| 1409280 | 10/1975 | United Kingdom . |
| 1437855 | 6/1976 | United Kingdom . |
| 1483691 | 8/1977 | United Kingdom . |
| 2050383 | 1/1981 | United Kingdom . |
| 659600 | 4/1979 | U.S.S.R. . |

*Primary Examiner*—Joseph L. Schofer
*Assistant Examiner*—Bernard Lipman
*Attorney, Agent, or Firm*—Luther A. R. Hall

[57] ABSTRACT

The invention provides partial esters of a polymer containing maleic anhydride or maleic acid radicals and an alkoxylated alcohol, an alkoxylated alkyl phenol or a polyalkylene glycol.

The products are useful as demulsifiers for water-in-oil emulsions.

6 Claims, No Drawings

POLYMALEIC ANHYDRIDE DERIVATIVES

The present invention relates to esters of polymers containing maleic anhydride or maleic acid radicals and their use for the demulsification of water-in-oil emulsions, especially emulsions of water in crude oil.

Accordingly the present invention provides a partial ester of a polymer containing maleic anhydride or maleic acid radicals and an alkoxylated alcohol, an alkoxylated alkyl phenol or a polyalkylene glycol.

The polymer may be (a) polymaleic anhydride, which may be hydrolysed, (b) a copolymer of maleic anhydride with one or more ethylenically unsaturated monomers, which may be hydrolysed, or (c) an amide or imide modified polymer formed by partial reaction of polymer (a) or (b) with a primary or secondary amine.

When the polymer is poly(maleic anhydride) it may be prepared by polymerising maleic anhydride in an aromatic hydrocarbon solvent in the presence of a peroxide catalyst, as described in British Patent Specificaion Nos. 1193146, 1024725, 1411063 or 1529092. The polymer may be esterified directly or it may first be hydrolysed by reaction with water, an acid, or an alkali.

When the polymer is a copolymer of maleic anhydride with one or more ethylenically unsaturated monomers, these monomers can be selected from a wide range of compounds. Suitable compounds include acrylic acid, methacrylic acid, crotonic acid, itaconic acid, aconitic acid and their esters such as ethylacrylate and methyl methacrylate, ethyl crotonate, glycidyl methacrylate, 2-hydroxyethylmethacrylate, 2-hydroxypropylmethacrylate, 2-hydroxyethyl acrylate, 2-hydroxypropyl acrylate, dimethyl itaconate, acrylonitrile, acrylamide, N-hydroxymethylacrylamide, N,N-dimethyl acrylamide, N-acrylamidoglycollic acid, vinyl acetate, vinyl sulphonic acid, allyl sulphonic acid, 4-styrene sulphonic acid, vinyl phosphonic acid, styrene phosphonic acid, allyl alcohol, allyl acetate, styrene, α-methylstyrene, ethylene, propylene, hexene, 2,4,4-trimethyl-pent-1-ene, N-acrylamidopropane sulphonic acid, or mixtures thereof.

When mixtures of monomers are used the resulting polymer may be, e.g. a terpolymer derived from maleic anhydride and two other monomers, such as terpolymers derived from maleic anhydride, vinyl acetate and ethyl acrylate.

The molar ratio of maleic anhydride to other monomers may be from 1:1 to 100:1, e.g. 2.5:1 to 7:1.

The copolymers may be prepared by the method described in British Patent Specification No. 1414918.

The polymer may be esterified directly or it may first be hydrolysed by reaction with water, an acid or an alkali.

When the polymer is an amide or imide-modified polymer it may be one obtained by reacting a homopolymer or copolymer as described above with a primary or secondary amine.

It is believed that the reaction proceeds somewhat as follows—for simplicity, only the maleic anhydride radicals in the polymer are shown:

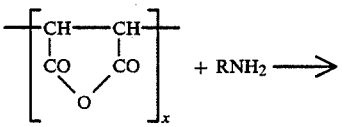 + RNH$_2$ ⟶

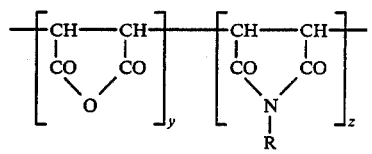

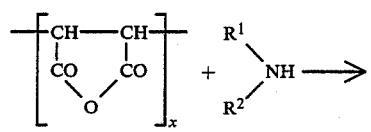 + $\begin{matrix}R^1\\R^2\end{matrix}$NH ⟶

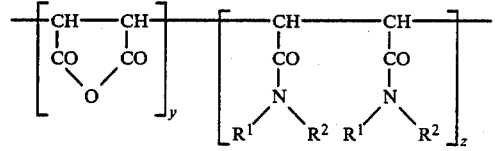

In these equations x=y+z and y>z. R represents a straight or branched chain alkyl radical having 4 to 14 carbon atoms; $R^1$ and $R^2$ may be the same or different and represent a straight or branched chain alkyl radical having 1 to 12 carbon atoms or $R^1$ and $R^2$ together with the nitrogen atom to which they are attached form a 5- or 6-membered heterocyclic ring which may be further interrupted by other hetero atoms such as nitrogen or oxygen.

Suitable primary amines which may be used include n-butylamine, pentylamine, hexylamine, heptylamine, octylamine, nonylamine, decylamine, t-dodecylamine and t-tetradecylamine. Suitable secondary amines which may be used include dimethylamine, diethylamine, dipropylamine, dibutylamine, methyl pentyl amine, ethyl hexyl amine, diheptyl amine, dioctylamine, didecylamine, di-t-dodecylamine, pyrrolidine, piperidine, and morpholine.

The amide or imide-modified polymer may be prepared by heating the polymer and the amine in a solvent, which may suitably be one used for preparing the polymer. The reaction may be carried out under reflux at the boiling point of the reaction mixture.

The partial ester of the invention is prepared by reacting the polymer with an alkoxylated alcohol or alkoxylated alkyl phenol. When an alkoxylated alcohol is used it may be one having the general formula:

$$R^3O\text{-}(CH_2CHO)_{\overline{n}}H$$
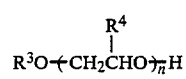

where $R^3$ is a straight or branched chain alkyl radical having 1 to 18 carbon atoms, $R^4$ is hydrogen or methyl and n is an integer from 1 to 20, preferably from 8 to 14.

The alkoxylated alcohols may be prepared by reacting an alcohol with ethylene oxide and/or propylene oxide. Suitable alcohols include methanol, ethanol, isopropyl alcohol, sec-butyl alcohol, t-amyl alcohol, n-hexanol, iso-octanol, n-decanol, n-dodecanol, and octadecyl alcohol.

When an alkoxylated alkyl phenol is used it may be one having the general formula:

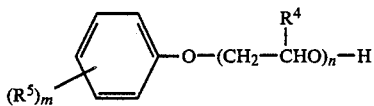

where $R^4$ and n are as defined above, $R^5$ is a straight or branched chain alkyl radical having 1 to 12 carbon atoms and m is an integer from 1 to 3.

Suitable alkyl phenols which may be alkoxylated include cresol, xylenol, ethyl phenol, isopropyl phenol, 2,4,6-triisopropyl phenol, t-butyl phenol, octyl phenol, nonyl phenol, decyl phenol and p-dodecyl phenol.

When a polyalkylene glycol is used it may be one having the general formula:

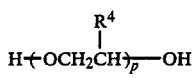

where $R^4$ is hydrogen or methyl and p is an integer from 3 to 30.

Each $R^4$ in the molecule may be the same or different. When they are the same, the compound is a polyethylene glycol or a polypropylene glycol. Where some are hydrogen and some are methyl the compound may be a block copolymer from ethylene oxide and propylene oxide or it may be a random copolymer.

The copolymer may have the general formula:

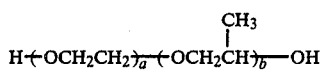

where a and b are integers from 3 to 30.

The esterification reaction to produce the partial esters of the invention may be carried out by mixing the polymer an esterifying agent and heating them until the theoretical amount of water is removed. The reaction may be carried out in an inert solvent and optionally in the present of an esterification catalyst such as dibutyl tin oxide. The reaction temperature may be from 160° C. to the boiling point of the reaction mixture.

It should be noted that some of the products give a very low acid value. This is because some of the acid or anhydride groups in the polymer are hindered. They are not esterified, but also do not show in the acid value test.

The partial ester may have from 25 to 75% of its acid or anhydride groups esterified, but preferably about 50%.

The partial esters of the invention are useful in demulsifying water-in-oil emulsions, especially emulsions of water in crude oil. They are useful in both production and refinery processes. In particular the compounds may be used in reducing the basic sediment and water content, known as "grindout" to those skilled in the art, present in crude oil emulsions.

The partial esters of the invention may be mixed with the emulsion, e.g. by agitation, and the liquid is then allowed to stand until the water and oil have separated.

The invention is illustrated by the following Examples, in which parts and percentages are by weight.

EXAMPLE 1

A mixture of 16.9 parts of a maleic acid tricotelomer (50% aqueous solution of a hydrolysed product from maleic anhydride, ethyl acrylate and vinyl acetate in a ratio of 6:1:1), 41.8 parts of an ethoxylated p-nonyl phenol (14 moles of ethylene oxide), 12 parts of xylene and 0.1 parts of dibutyl tin oxide is stirred and heated at 170°–80° C. until the theory water is removed using a Dean and Stark water separator. The mixture is then heated at 150° C. for 1 hour at 20 mm. Hg.

The resulting partial ester is a dark brown viscous oil.
Yield=96%
Acid value=20 mg KOH $g^{-1}$
Hydroxyl value=12 mg KOH $g^{-1}$

EXAMPLE 2

A mixture of 20.2 parts of a 52.3% aqueous solution of polymaleic acid, 28.6 parts of an ethoxylated p-nonyl phenol (8 moles of ethylene oxide), 13 parts of xylene and 0.07 parts of dibutyl tin oxide is stirred and heated at 170° C.–175° C. until the theory water is removed using a Dean and Stark water separator. The mixture is then heated up to 150° C. during 30 minutes at 30 mm. Hg.

The resulting partial ester is a dark brown viscous oil.
Yield=89%
Acid value=40 mg KOH $g^{-1}$
Hydroxyl value=8 mg KOH $g^{-1}$

EXAMPLE 3

Example 2 is repeated except that the 28.6 parts of ethoxylated p-nonyl phenol is replaced by a mixture of 25.1 parts of ethoxylated p-nonyl phenol (14 moles of ethylene oxide) and 4.0 parts of polyethylene glycol 400.

The resulting partial ester is a dark brown viscous oil.
Yield=87%

EXAMPLE 4

Example 2 is repeated except that the 28.6 parts of ethoxylated p-nonyl phenol is replaced by a mixture of 20.4 parts of ethoxylated decanol (12 moles of ethylene oxide) and 4.0 parts of polyethylene glycol 400.

The resulting partial ester is a dark brown viscous oil.
Yield=93%

EXAMPLE 5

Example 2 is repeated except that the 28.6 parts of ethoxylated p-nonyl phenol is replaced by a mixture of 20.9 parts of ethoxylated p-nonyl phenol (14 moles of ethylene oxide) and 31.25 parts of an ethylene oxide (30%) propylene oxide (70%) block copolymer, m.w.=2,500 sold under the trade name "Jaypol 410".

The resulting partial ester is a dark brown viscous oil.
Yield=95%
GEL permeation chromatography:
  M.W. range 400 to >10,000
  M.W. peak >10,000

EXAMPLE 6

A mixture of 19.9 parts of polymaleic anhydride and 68.1 parts of ethoxylated decanol (12 moles of ethylene oxide) is stirred and heated up to 180° C. over 1.5 hrs and then kept at this temperature for a further 4 hrs.

The resulting partial ester is a dark brown viscous oil.
Yield=90%
Acid value=3 mg KOH $g^{-1}$
Hydroxyl value=11 mg KOH $g^{-1}$

EXAMPLE 7

Example 6 is repeated except that the 68.1 parts of ethoxylated decanol is replaced by a mixture of 40.9 parts of ethoxylated decanol (12 moles of ethylene oxide) and 8.0 parts of polyethylene glycol 400.

The resulting partial ester is a dark brown viscous oil.
Yield=85%

EXAMPLE 8

A mixture of 24.6 parts of a maleic acid copolymer (1:1 maleic anhydride:2,4,4 trimethyl pent-1-ene), 34.1 parts of ethoxylated decanol (12 moles of ethylene oxide), 10 parts of xylene and 0.1 part of dibutyl tin oxide is stirred and heated up to 180° C. during 4 hrs and kept for a further 1 hr at this temperature. The mixture is then heated up to 140° C. during 2 hours at 13 mm Hg.

The resulting partial ester is a dark brown viscous oil.
Yield=92%

EXAMPLE 9

(a) 21.8 parts of morpholine is added dropwise, over a 20 minute period to a stirred solution of 99.5 parts of polymaleic anhydride dissolved in 100 parts of methyl ethyl ketone at 80° C. The solution is refluxed at 80° C. for a further 2 hours. The solvent was removed by distillation at atmospheric pressure and finally under reduced pressure (max. internal temperature 105° C.).

The resulting fawn solid has a melting range of 122°–145° C.
Yield=97%
Acid value=249 mg KOH $g^{-1}$ I.R. spectra indicated anhydride, amide and amine salt to be present.

(b) A mixture of 60.6 parts of the above product, 81.5 parts of ethoxylated decanol (12 moles of ethylene oxide) 24 parts of xylene and 0.2 parts of dibutyl tin oxide is stirred and heated at 160°–80° C. until the theory water is removed using a Dean and Stark water separator. The mixture is then heated at 150° C. for one and half hours at 20 mm Hg.
Yield=96%
Acid value=26.4 mg KOH $g^{-1}$
Nitrogen=5.61%
GEL permeation chromatography
Mw=2226
Mn=647

I.R. spectrum indicates amide and ester present.

EXAMPLE 10

(a) 47.8 parts of a t-alkylated primary amine (average chain length of $C_{12}$, available commercially under the trade name "Primene 81R") is added dropwise over a 60 minute period, to a stirred mixture of 99.5 parts of polymaleic anhydride and 100 parts of xylene at 110° C. Heating and stirring is continued for a further 2 hours. The mixture is then heated to 140°–180° C. (oil-bath) at 20 mm Hg to remove the solvent.
Yield=78%
Acid value=146 mg KOH $g^{-1}$ I.R. spectrum indicated anhydride and imide present.

(b) A mixture of 60 parts of the above product, 106 parts of ethoxylated decanol (12 moles of ethylene oxide), 20 parts of xylene and 0.16 parts of dibutyl tin oxide is stirred and heated at 160°–200° C. until the theory water is removed using a Dean and Stark water separator. The mixture is then heated at 150° C. for 1 hour at 20 mm Hg.
Yield=98%
Acid value=20.2 mg KOH $g^{-1}$
Nitrogen=4.45%
GEL permeation chromatography
Mw=2220
Mn=1268

EXAMPLE 11

A mixture of 9.95 parts of polymaleic anhydride and 41.8 parts of ethoxylated p-nonyl phenol (14 moles of ethylene oxide) is stirred and heated for 25 hrs, during which time the temperature is gradually raised from 130° C. to 196° C. The resulting partial ester is a dark brown viscous oil.
Yield=95%
Acid value=13 mg KOH $g^{-1}$
Hydroxyl value=8 mg KOH $g^{-1}$
M.W. range 400 to 7,000
M.W. peak 5,000

EXAMPLES 12-23

Demonstration of demulsifier activity (see Table 1)

This is carried out using the "Bottle Test" procedure essentially as described in Chapter VII, pages 33–43 of "Treating Oilfield Emulsions" issued by the Petroleum Extension Service (revised edition, 1974), but using synthetic emulsions.

A brief summary of our modifications is given.

Demulsifier evaluation is conducted by taking the appropriate quantities of crude oil and brine (8% w/w NaCl) and mixing under high shear for a fixed period of time in a Waring Blender. Aliquots of 100 ml emulsion are poured into a 150 ml capacity conical centrifuge tube followed by a specific quantity of the demulsifier as a 1% w/w solution in a mixed xylene-methanol solvent (3:1 by volume).

After sealing, the bottles are shaken manually for a fixed number of times to disperse the demulsifier and then either observed at ambient temperature or placed in a water bath at a prescribed temperature. After allowing for a short warm-up period, the bottles are gently inverted a fixed number of times to aid coalescence of separated water. Then this and subsequent separated water is recorded at period intervals.

Test conditions are as follows:
Emulsions are prepared from a Kuwait crude oil and 10% of 8% sodium chloride solution:
Temperature of separation=60° C.
Settling time=60 mins.

Demulsifier dose level: As is well known to those skilled in the art, selection of the correct dose level is crucial in achieving optimum demulsifier performance. The appropriate dose level for each additive is determined by examining a range of dose levels: 50, 100, 150 and 200 ppm, respectively, when testing each additive. Also included for comparison is a blank formulation with no additive.

Demulsifier test results obtained using products of Examples 1 to 11 inclusive, and typical results given by "blank" formulations are shown in Table 1.

Results are expressed as total % of brine separated from the emulsion (A) (=% of brine which visibly separates out+% of water obtained in the grindout) and % basic sediment (B). (A) should, of course, be as close to 100% as possible since this represents the efficiency of the emulsion breaking process. (B) should be as small as possible. The lower this figure, the higher is the quality of the recovered oil.

TABLE 1
Demonstration of demulsifier activity

| Example | Additive | Dose Level (ppm) | Total Brine separated (%) | Basic Sediment (%) |
|---|---|---|---|---|
| 12 | Prod. of Ex. 1 | 150 | 101 | 0 |
| 13 | Prod. of Ex. 2 | 50 | 96 | 1.2 |
| 14 | Prod. of Ex. 3 | 150 | 102 | 1.2 |
| 15 | Prod. of Ex. 4 | 200 | 102 | 1.0 |
| 16 | Prod. of Ex. 5 | 100 | 112 | 0.8 |
| 17 | Prod. of Ex. 6 | 150 | 104 | 0 |
| 18 | Prod. of Ex. 7 | 200 | 102 | 1.0 |
| 19 | Prod. of Ex. 8 | 200 | 105 | 0.6 |
| 20 | Prod. of Ex. 9 | 150 | 97 | 0.6 |
| 21 | Prod. of Ex. 10 | 150 | 98 | 0 |
| 22 | Prod. of Ex. 11 | 150 | 99 | 0 |
| 23 | None | — | 1.1 | 13 |

I claim:

1. A method for demulsifying a water-in-oil emulsion which comprises
admixing an effective amount of the partial ester reaction product obtained by reacting a polymer or copolymer containing recurring structural units selected from the group consisting of

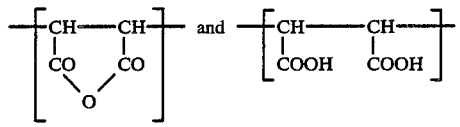

or said copolymer which additionally contains recurring structural units

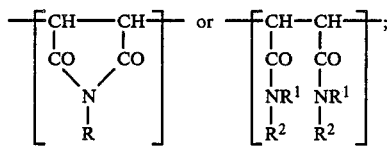

where R represents a straight or branched alkyl having 4 to 14 carbon atoms, $R^1$ and $R^2$ are the same or different and represent a straight or branched chain alkyl having 1 to 12 carbon atoms, or $R^1$ and $R^2$ together with the nitrogen atom to which they are attached form a 5- or 6-membered heterocyclic ring which is pyrrolidine, piperidine or morpholine, or said copolymer which additionally is a copolymer of maleic anhydride with one or more ethylenically unsaturated monomer selected from the group consisting of acrylic acid, methacrylic acid, crotonic acid, itaconic acid, aconitic acid, ethyl acrylate, methyl methacrylate, ethyl crotonate, glycidyl methacrylate, 2-hydroxyethyl methacrylate, 2-hydroxypropyl methacrylate, 2-hydroxyethyl acrylate, 2-hydroxypropyl acrylate, dimethyl itaconate, acrylonitrile, acrylamide, N-hydroxymethylacrylamide, N,N-dimethylacrylamide, N-acrylamidoglycolic acid, vinyl acetate, vinyl sulfonic acid, allyl sulfonic acid, 4-styrenesulfonic acid, vinyl phosphonic acid, styrene phosphonic acid, allyl alcohol, allyl acetate, styrene, alpha-methylstyrene, ethylene, propylene, hexene, 2,4,4-trimethylpent-1-ene, N-acrylamidopropane sulfonic acid and mixtures thereof,
with an alkoxylated alcohol of the formula

where $R^3$ is a straight or branched chain alkyl having 1 to 18 carbon atoms, $R^4$ is hydrogen or methyl and n is an integer from 1 to 20;
with an alkoxylated alkyl phenol of the formula

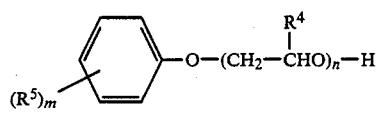

wherein $R^4$ is hydrogen or methyl, n is an integer from 1 to 20, $R^5$ is a straight or branched chain alkyl having 1 to 12 carbon atoms and m is an integer from 1 to 3;
with a polyalkylene glycol of the formula

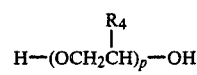

wherein $R^4$ is hydrogen or methyl and p is an integer from 3 to 30; or
with a mixture thereof,
where from 25 to 75% of the acid or anhydride groups in the polymer or copolymer are esterified;
into said emulsion with agitation, and then
allowing the water and oil to separate upon standing.

2. A method according to claim 1 wherein the copolymer is a terpolymer of maleic anhydride with two other ethylenically unsaturated monomers.

3. A method according to claim 2 in which the terpolymer is formed from maleic anhydride, vinyl acetate and ethyl acrylate.

4. A method according to claim 1 in which the copolymer contains recurring structural units

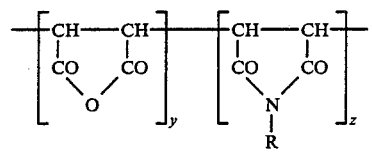

or

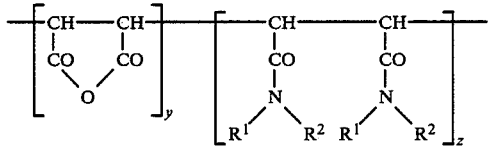

in which y>z.

5. A method according to claim 1 in which n is from 8 to 14.

6. A method according to claim 1 in which about 50% of the acid or anhydride groups in the polymer are esterified.

* * * * *